United States Patent
Kim et al.

(10) Patent No.: US 9,322,981 B2
(45) Date of Patent: Apr. 26, 2016

(54) LIQUID DISPLAY APPARATUS

(71) Applicant: LG Display Co., Ltd., Seoul (KR)

(72) Inventors: Junhyuk Kim, Gyeongsangbuk-do (KR); Hyeonsoo Hong, Daegu (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 14/089,913

(22) Filed: Nov. 26, 2013

(65) Prior Publication Data
US 2014/0146269 A1    May 29, 2014

(30) Foreign Application Priority Data

Nov. 28, 2012  (KR) .................. 10-2012-0136581

(51) Int. Cl.
*G02F 1/1333* (2006.01)
*F21V 8/00* (2006.01)
*G02F 1/1335* (2006.01)

(52) U.S. Cl.
CPC ........ *G02B 6/0081* (2013.01); *G02F 1/133308* (2013.01); *G02F 1/133608* (2013.01); *G02F 2001/133331* (2013.01); *G02F 2201/503* (2013.01)

(58) Field of Classification Search
CPC ............. G02F 1/133308; G02F 2001/133331; G02F 2001/133314
USPC ......................................................... 349/58
See application file for complete search history.

(56) References Cited

U.S. PATENT DOCUMENTS

| 5,119,204 | A | * | 6/1992 | Hashimoto et al. | ........... 348/794 |
| 5,583,681 | A | * | 12/1996 | Shioya et al. | ................... 349/60 |
| 2008/0170170 | A1 | * | 7/2008 | Jung | ................... G02B 6/0021 349/58 |
| 2009/0185101 | A1 | * | 7/2009 | Matsuhira et al. | ............... 349/58 |
| 2011/0235364 | A1 | * | 9/2011 | Lo | ..................... G02F 1/133308 362/611 |

FOREIGN PATENT DOCUMENTS

| CN | 101226294 A | 7/2008 |
| TW | 201133088 A | 10/2011 |

OTHER PUBLICATIONS

The First Office Action dated Dec. 29, 2015 from The State Intellectual Property Office of the People's Republic of China in Chinese in counterpart application No. 201310627293.1.

* cited by examiner

*Primary Examiner* — Thanh-Nhan P Nguyen
(74) *Attorney, Agent, or Firm* — Morgan, Lewis & Bockius LLP

(57) ABSTRACT

A liquid crystal display includes a support frame having a partitioned storage space; a backlight unit disposed in the storage space; a liquid crystal display panel disposed over the backlight unit and spaced apart from the backlight unit by a gap; and a cover window combined with the support frame such that the liquid crystal display panel is attached to the cover window.

14 Claims, 3 Drawing Sheets

LIQUID DISPLAY APPARATUS

This application claims the benefit of Korean Patent Application No. 10-2012-0136581 filed on Nov. 28, 2012, which is incorporated herein by reference for all purposes as if fully set forth herein.

BACKGROUND OF THE INVENTION

1. Field of the Invention

The present invention relates to a liquid crystal display, and more particularly, to a liquid crystal display including a narrow bezel having a reduced size.

2. Discussion of the Related Art

In general, a liquid crystal display is a device for displaying a desired image by controlling light transmittance of liquid crystal cells, arranged in a matrix form, in response to image signal information. The liquid crystal panel of the liquid crystal display displays an image using light supplied by a backlight unit.

A liquid crystal display, using such a principle, has become widely applied to various fields due to characteristics, such as light weight, slimness, and low power consumption. As a result, a liquid crystal display is used in office automation devices, audio/video devices, etc. Such a liquid crystal display displays a desired image on a screen by controlling the amount of transmitted light in response to a signal applied to a plurality of control switches arranged in a matrix form.

Recently, a liquid crystal display is widely applied for the display in navigation systems, notebooks, mobile phones, etc., in addition to computer monitors and TVs.

Most liquid crystal displays are non-emissive type displays for displaying images by controlling the amount of external light. Thus, such liquid crystal displays require a backlight unit including an additional light source for radiating light to a liquid crystal display panel.

The backlight unit may include an LED device as a light source, a light guide plate combined with the exit surface of the LED device, and a plurality of sheets provided over the light guide plate.

In general, the backlight unit and the liquid crystal panel are supported by a guide panel and packaged by an upper casing and a lower casing. Here, the edge of the liquid crystal panel is covered by a light-shield tape, and this portion forms a bezel.

The bezel is a portion on which an image is not displayed, forming the border of a screen. In a recent liquid crystal display, an attempt is made to make a screen visually look larger by minimizing the bezel size.

However, reducing a bezel area that forms the border of a screen is limited due to the volume of the guide panel itself because the backlight unit and the liquid crystal display panel are supported in the state in which the guide panel is disposed in the bezel area.

Furthermore, in general, a liquid crystal display is implemented by producing an intermediate product called a Liquid Crystal Module (LCM) and combining a window and a support frame in the state in which the LCM has been received in equipment called a support frame. Accordingly, after the liquid crystal display is implemented, the volume of the liquid crystal display is increased due to the LCM, and a reduction of a bezel size is limited.

SUMMARY OF THE INVENTION

Accordingly, the present invention is directed to a liquid crystal display that substantially obviates one or more of the problems due to limitations and disadvantages of the related art.

An object of the present invention is to provide a slim display with reduced bezel size by disposing a backlight in a support frame without modulating the backlight.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the invention, as embodied and broadly described, a liquid crystal display comprises a support frame including a partitioned storage space; a backlight unit disposed in the storage space; a liquid crystal display panel disposed over the backlight unit and spaced apart from the backlight unit by a gap; and a cover window combined with the support frame such that the liquid crystal display panel is attached to the cover window.

In another aspect, a method of manufacturing a liquid crystal display, comprises disposing a backlight unit in a support frame, the support frame partitioned into lower and upper spaces by lower and upper projection units such that the backlight unit is disposed in the lower space; fixing the backlight unit to the support frame; attaching a cover window to a liquid crystal display panel; disposing the liquid crystal display panel having the cover window attached thereto in the support frame such that the display panel is disposed in the upper space of the support frame and the cover window disposed on a top surface of the upper projection unit such that liquid crystal display panel is held to define a gap between the liquid crystal display panel and the backlight unit.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE INVENTION

Figure 1:
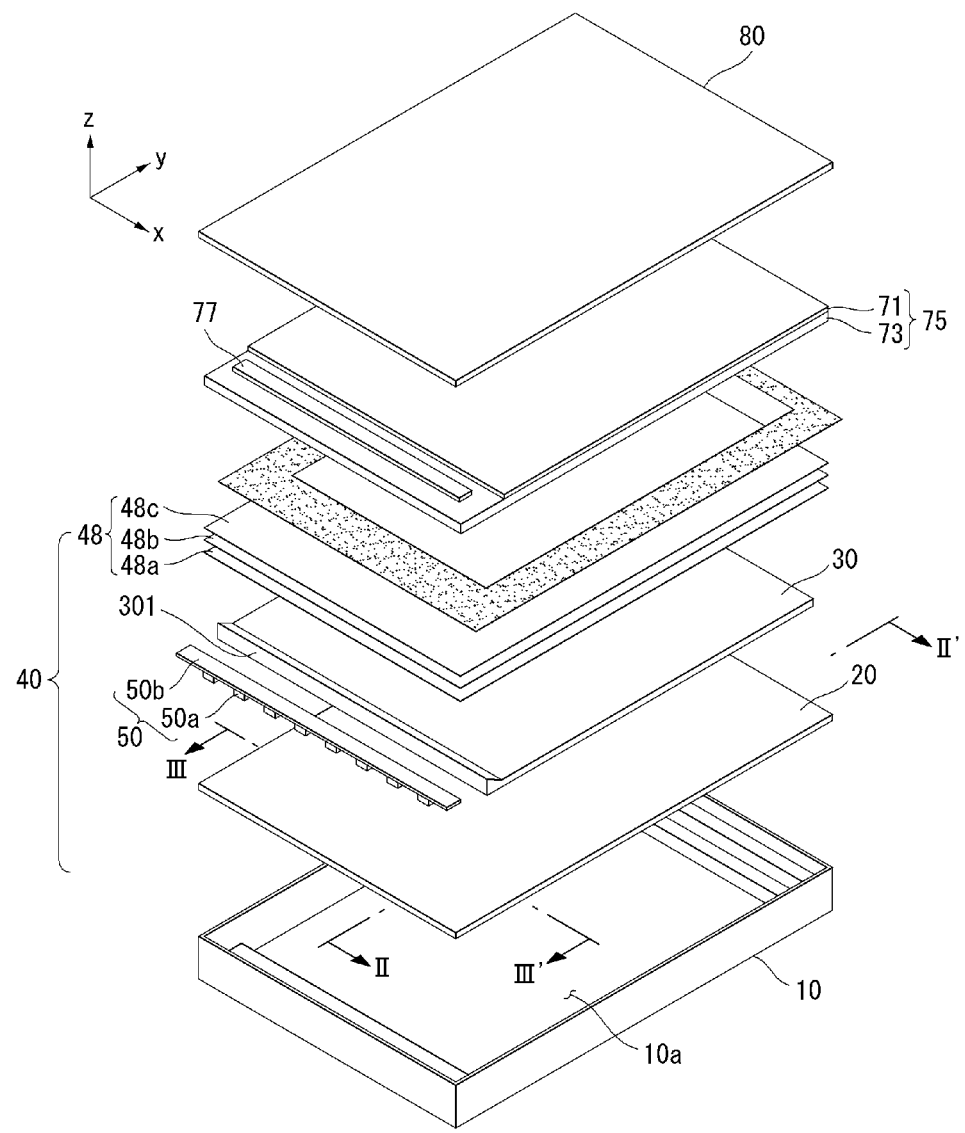
FIG. 1 is a schematic exploded perspective view of a liquid crystal display in accordance with an example embodiment according to the present invention.

Reference will now be made in detail to the preferred embodiments of the present invention, examples of which are illustrated in the accompanying drawings. In the specification, the same reference numerals may denote substantially the same elements. In the following description, a detailed description of known functions or constructions related to the present invention will be omitted if it is deemed that such description would make the gist of the present invention unnecessarily vague.

Figure 2:
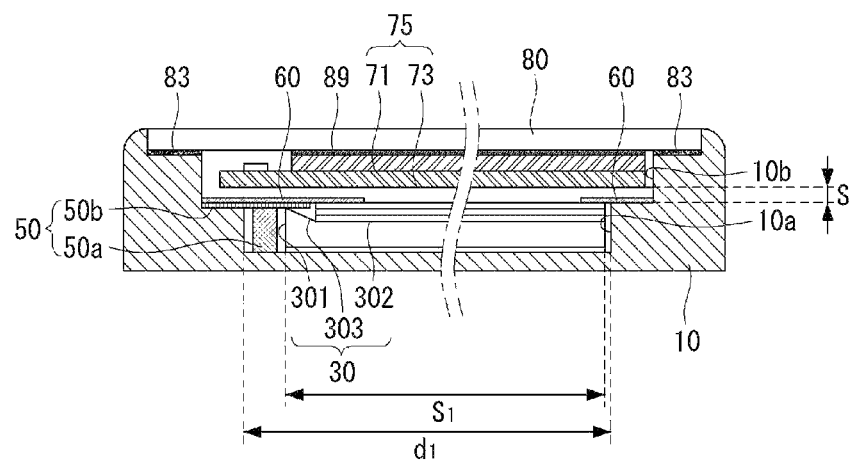
FIG. 2 is a schematic cross-sectional view taken line II-II' of FIG. 1.
Figure 3:
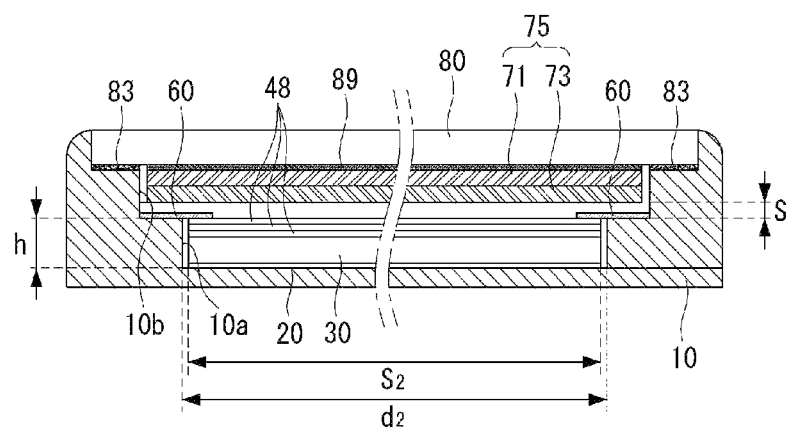
FIG. 3 is a schematic cross-sectional view taken line III-III' of FIG. 1.

FIG. 1 is a schematic exploded perspective view of a liquid crystal display in accordance with an example embodiment according to the present invention, and FIGS. 2 and 3 are schematic cross-sectional views taken line II-II' and III-III' of FIG. 1.

In FIGS. 1 to 3, the liquid crystal display may include a support frame 10, a backlight unit 40 received in the support frame 10, a liquid crystal display panel 75 disposed over the backlight unit 40, and a cover window 80 configured to fix the liquid crystal display panel 75 when combined with the support frame 10.

The support frame 10 forms the externally apparent portion of the display device and receives the backlight unit 40 therein. Here, the support frame 10 may include a storage space partitioned (e.g., sectioned) by a lower projection unit 10a to receive the backlight unit. The reflection plate 20, the light guide plate 30, the light source 50, and the optical sheet 48, which form the backlight unit 40, are sequentially stacked over the storage space partitioned by the lower projection unit 10a. The lower projection unit 10a has the same height 'h' as the total height of a reflection plate 20, a light guide plate 30, and an optical sheet 48. Furthermore, the width 'd1' of the storage space partitioned by the lower projection unit 10a is identical with or slightly greater than the length 's1' of the backlight unit 40 in a horizontal direction, and the width 'd2' of the storage space in a vertical direction is identical with or slightly greater than the length 's2' of the backlight unit 40 in a vertical direction. Accordingly, the backlight unit 40 can be stably received in the storage space of the support frame 10 without any structure.

The backlight unit 40 may include the light source 50 to supply light to the liquid crystal display panel 75, the light guide plate 30 to guide light emitted from the light source 50 and supply the light to the liquid crystal display panel 75, the reflection sheet 20 placed at the bottom of the light guide plate 30 and to reflect light, and the optical sheet 48 to convert light supplied by the light source 50 into a uniform surface light source and to supply the surface light source to the liquid crystal display panel 75.

The reflection sheet 20 is placed at the bottom of a case 10, and the light guide plate 30 and the optical sheet 48 are sequentially disposed over the reflection sheet 20. The reflection sheet 20 is placed under the light guide plate 30. The reflection sheet 20 reflects light, downward traveling from the light guide plate 30, to the light guide plate 30 in order to increase light efficiency and controls the amount of reflection of the entire incident light so that the entire light output surface has a uniform luminance distribution.

The light source 50 is disposed as an edge type light facing the incidence surface 301 at an edge of the light guide plate 30. The light source 50 may include light-emitting diodes 50a and a flexible PCB 50b on which the light-emitting diodes are mounted. The flexible PCB 50b is a board with excellent flexibility and configured to turn on and off the light-emitting diodes 50a using an internal circuit. In the example embodiment as illustrated, the light source 50 adopts a side-view method in which the flexible PCB 50b is disposed on the upper side and the light-emitting diodes 50a are disposed to face the incidence surface 301 of the light guide plate 30 under the flexible PCB 50b. That is, as shown in FIG. 2, the light-emitting diodes 50a are disposed to laterally face the incidence surface 301 of the light guide plate 30, and the flexible PCB 50b is placed over the light-emitting diodes 50a. Here, the flexible PCB 50b is attached to a light-shield tape 60 placed over the flexible PCB 50b, thereby maintaining the fixed state.

Because the light source 50 is disposed to face the incidence surface 301, light from the light source 50 is incident on the light guide plate 30 through the incidence surface 301 and is then supplied to the liquid crystal display panel 75 through the optical sheet 48 disposed over the light guide plate 30.

The light guide plate 30 may include the incidence surface 301 configured to receive light from the light-emitting diodes 50a, an exit surface 302 configured to face the liquid crystal display panel 75 and supply light, and a slant surface 303 configured to connect the incidence surface 301 and the exit surface 302. The slant surface 303 is formed to have a height that is gradually lowered from the incidence surface 301 toward the exit surface 302, and the height of the exit surface 302 is constant. The optical sheet 48 is disposed over the exit surface 302. Accordingly, the thickness of the display device can be reduced, the weight of the display device can be reduced, and the display device can be modulated slimly. The light guide plate 30 may be made, for example, of polymethy-methacrylate (PMMA) or poly carbonate which is not easily deformed or broken due to high strength and which has good transmittance.

The optical sheet 48 is disposed over the exit surface 302 of the light guide plate 30. The optical sheet 48 functions to diffuse and condense light incident from the light guide plate 30 and includes a diffusion sheet 48a, a prism sheet 48b, and a protection sheet 48c. The diffusion sheet 48a includes a base plate and a bead-shaped coating layer formed in the base plate. The diffusion sheet 48a diffuses light from the light source 50 and supplies the diffused light to the liquid crystal display panel 75. The prism sheet 48b has trigonal prisms formed on a top surface thereof in a constant array and condenses light, diffused by the diffusion sheet 48a, in a direction vertical to the plane of the liquid crystal display panel 75. The protection sheet 48c functions to protect the prism sheet 48b that is vulnerable to scratches.

The reflection plate 20, the light guide plate 30, and the optical sheet 48 are sequentially stacked in the storage space of the support frame 10. The height 'h' of the lower projection unit 10a is the same as the total height of the reflection plate 20, the light guide plate 30, and the optical sheet 48. Accordingly, when the reflection plate 20, the light guide plate 30, and the optical sheet 48 are placed in the storage space, they are placed in the same height with a gap interposed between the lower projection unit 10a and the reflection plate 20, the light guide plate 30, and the optical sheet 48.

The light-shield tape 60 is placed on a top surface of the lower projection unit 10a and along the edge of the upper part of the backlight unit 40, thereby fixing the backlight unit 40 and also preventing light leakage.

The backlight unit 40 is disposed in the storage space partitioned according to the size of the backlight unit 40 and fixed to the support frame 10 by the light-shield tape 60. Accordingly, the backlight unit 40 can be stably fixed even without additional structures, such as a guide panel.

The liquid crystal display panel 75 is disposed in the space formed by a upper projection unit 10b over the backlight unit 40 with an air gap S interposed between the liquid crystal display panel 75 and the backlight unit 40. In the example illustrated embodiment, the liquid crystal display panel 75 is not stacked over the backlight unit 40, but is spaced apart from the backlight unit 40 by the air gap S and also disposed in the space formed by the upper projection unit 10b. Accordingly, although an impact is applied to the support frame 10, the liquid crystal display panel 75 does not collide against other elements due to the impact, thereby being capable of increasing the impact reliability of the display device.

The liquid crystal display panel 75 includes a thin film transistor (TFT) substrate 73 formed of a plurality of TFTs, a color filter substrate 71 coalesced with the TFT substrate 73, and liquid crystals (not shown) injected between the substrates 71 and 73. The TFT substrate 73 may be a transparent substrate in which the TFTs are formed in a matrix form. Data lines are connected to the source terminals of the TFT substrate 73, and a gate lines are connected to the gate terminals thereof. The data lines and the gate lines are connected to an integrated circuit (IC) chip 77. Furthermore, a flexible PCB (not shown) is connected to one side of the IC chip 77. When an electrical signal is received from the flexible PCB, the electrical signal is input to the data lines and the gate lines through the IC chip and the TFTs disposed in respective pixels are turned on or off in response to the electrical signal, thus applying driving voltage to the pixels or blocking the supply of the driving voltage.

The color filter substrate 71 is coalesced over the TFT substrate 73. The color filter substrate 71 is a substrate in which RGB pixels, that is, color pixels from which specific colors are generated while light passes through the color filter substrate 71, are formed.

The liquid crystal display panel 75 is fixed to the cover window 80 using a photo-curable resin 89, such as OCR. The photo-curable resin 89 is a substance that is present in a liquid state and cured through a reaction with ultraviolet rays.

The cover window 80 may be made of tempered glass. The cover window 80 protects an external appearance of the display device like the support frame 10 and protects the liquid crystal display panel 75 from an impact. The edge of the cover window 80 is supported by the support frame 10 and fixed to adhesion means 83, such as double-sided tape.

In the example embodiment, a display device can be made slim because the backlight unit is directly mounted on the support frame that forms an external appearance of the display device without modulating the backlight unit as described above. Furthermore, the size of a bezel, which is bulky in the related art display devices, can be reduced because an additional structure for fixing a backlight unit, such as the related art guide panel, is not necessary.

A method of manufacturing the liquid crystal display constructed as described above will now be described below with reference to FIG. 4.

Figure 4:
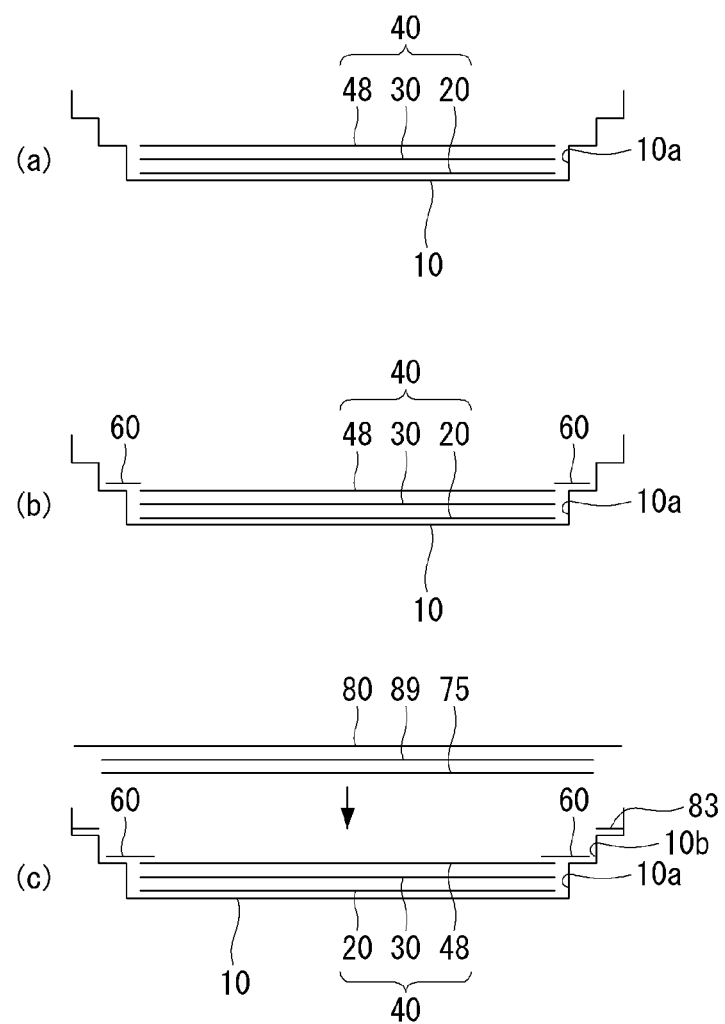
FIG. 4 is a diagram illustrating a process of modulating the liquid crystal display according to an example embodiment.

As shown in FIG. 4, the reflection plate 20, the light guide plate 30, and the optical sheet 48 are sequentially received in the storage space partitioned by the lower projection unit 10a according to the size of the backlight unit 40 as shown in FIG. 4(A). Here, the reflection plate 20, and the light guide plate 30, and the optical sheet 48 are placed and partially exposed such that they do not overlap with each other in a non-display region. The exposed portions can be fixed by double-sided tape.

After the backlight unit 40 is received in the storage space as described above, the light-shield tape 60 is attached on a top surface of the lower projection unit 10a and along part of the edge of the backlight unit 40, thereby fixing the backlight unit 40 as shown in FIG. 4(B).

Next, the liquid crystal display panel 75 combined with the cover window 80 using the photo-curable resin 89 is disposed in the space partitioned by the upper projection unit 10b. Here, the liquid crystal display panel 75 is placed with the air gap interposed between the liquid crystal display panel 75 and the backlight unit 40. The edge of the cover window 80 is supported by the support frame 10 and fixed by the adhesion means 83, such as a double-sided tape, thereby completing a liquid crystal display.

In accordance with an embodiment of the present invention, a device can be implemented slimly because the backlight is not assembled in an assembly form, but elements forming the backlight are directly installed in the support frame. Furthermore, the volume occupied by a related art guide panel, which was previously for assembly, can be reduced because the guide panel can be eliminated. Thus, a narrow bezel can be achieved.

It will be apparent to those skilled in the art that various modifications and variations can be made in the liquid crystal display of the present invention without departing from the sprit or scope of the invention. Thus, it is intended that the preset invention cover the modifications and variations of this invention provided they come within the scope of the appended claims and their equivalents.

What is claimed is:

1. A liquid crystal display, comprising:
    a support frame including a stepped projection unit having upper and lower projection units to define a partitioned storage space;
    a backlight unit disposed in the storage space at a portion corresponding to the lower projection unit;
    a liquid crystal display panel disposed over the backlight unit and having a height less than a height of the upper projection unit; and
    a cover window attached to an upper surface of the liquid crystal display panel and disposed on a top surface of the upper projection unit of the support frame such that the liquid crystal display panel is held by the cover window to be spaced apart from the backlight unit with a gap between the liquid crystal display panel and the backlight unit.

2. The liquid crystal display according to claim 1, wherein the lower projection unit defines a space corresponding to a size of the backlight unit.

3. The liquid crystal display according to claim 1, wherein the lower projection unit defines a space corresponding to a size of the backlight unit, and wherein the upper projection unit defines a space corresponding to a size of the liquid crystal display panel.

4. The liquid crystal display according to claim 3, wherein the lower projection unit has a height identical to a height of the backlight unit.

5. The liquid crystal display according to claim 3, further comprising a light-shield tape disposed on a top surface of the lower projection unit and along an edge of the backlight unit to fix the backlight unit to the support frame.

6. The liquid crystal display according to claim 1, wherein the liquid crystal display panel is attached to the cover window by a photo-curable resin.

7. The liquid crystal display according to claim 1, wherein the backlight unit includes a reflection plate, a light guide plate, and an optical sheet sequentially stacked in the storage space at the portion corresponding to the lower projection unit, and further includes a light source disposed to face an incidence surface of the light guide plate.

8. The liquid crystal display according to claim 1, wherein the cover window is contained within the support frame such that an upper surface of the cover window is substantially even with an upper edge of the support frame.

9. A method of manufacturing a liquid crystal display, comprising:
    disposing a backlight unit in a support frame, the support frame having a stepped projection unit having lower and upper projection units to define lower and upper spaces, wherein the backlight unit is disposed in the lower space;
    fixing the backlight unit to the support frame;

attaching a cover window to an upper surface of a liquid crystal display panel, the liquid crystal display panel having a height less than a height of the upper projection unit;

disposing the liquid crystal display panel having the cover window attached thereto in the support frame, display panel being disposed in the upper space of the support frame and the cover window being disposed on a top surface of the upper projection unit such that the liquid crystal display panel is held by the cover window to be spaced apart from the backlight unit with a gap defined between the liquid crystal display panel and the backlight unit.

10. The method according to claim 9, wherein the attaching the cover window to the upper surface of the liquid crystal display panel includes disposing a cover window on a liquid crystal display panel with a photo-curable resin disposed between the cover window and the liquid crystal display panel, and fixing the cover window with the liquid crystal display panel by irradiating the photo curable resin.

11. The method according to claim 9, wherein the fixing the backlight unit to the support frame includes applying double-sided tape to the backlight unit and an upper surface of the lower projection.

12. The method according to claim 9, wherein the backlight unit includes a reflection plate, a light guide plate, and an optical sheet.

13. The method according to claim 9, wherein the lower projection unit has a height identical to a height of the backlight unit.

14. The method according to claim 9, wherein the cover window is disposed on the top surface of the upper projection unit of the support frame such that an upper surface of the cover window is substantially even with an upper edge of the support frame.

* * * * *